Oct. 24, 1950 — P. M. HALL — 2,527,479
METHOD AND MEANS FOR FORMING JOINTS
Filed Oct. 18, 1946
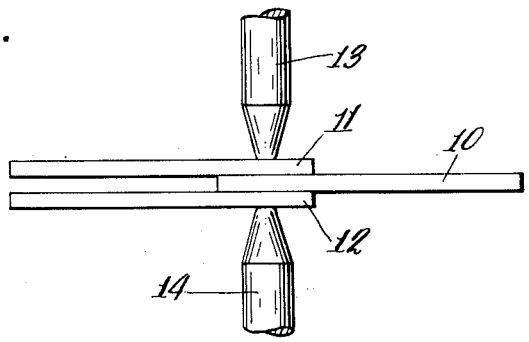
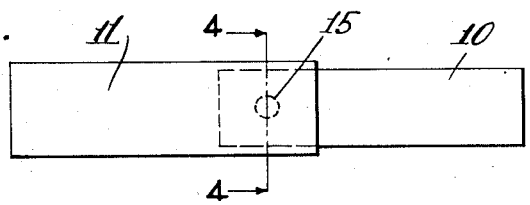
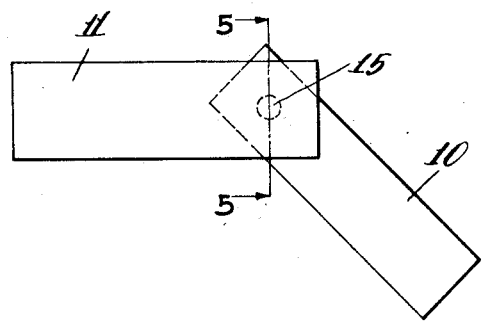
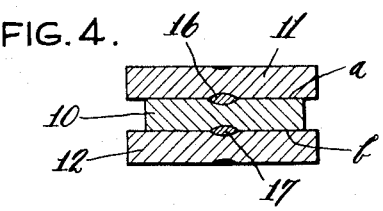
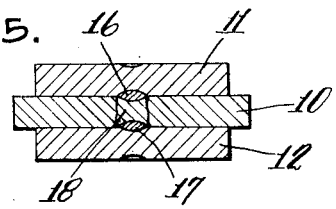
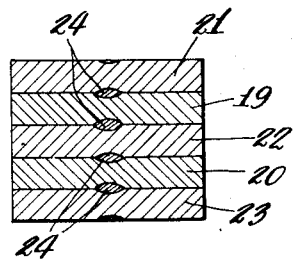
PRESTON M. HALL
INVENTOR
BY Michael Williams
ATTORNEY Patented Oct. 24, 1950

2,527,479

UNITED STATES PATENT OFFICE 2,527,479

METHOD AND MEANS FOR FORMING JOINTS

Preston M. Hall, Warren, Ohio

Application October 18, 1946, Serial No. 704,093

4 Claims. (Cl. 287—101)

My invention relates to methods of and means for forming joints, particularly pivot joints, and the principal object of my invention is to provide new and improved methods and means of the character described.

My invention contemplates the use of welding to form the joint, and in the present form, that type of electric resistance welding termed spot welding is preferably employed. A great many articles of manufacture require joints providing relative movement between parts, and many prior attempts have been made to produce a low cost joint.

Usually rivets or bolt connections are used, but some prior art shows the use of welding to form a joint. However, in every case prior to this invention, the connection comprised pre-formed parts which were either worked cold or hot, or were welded, to form a joint providing for relative movement of the parts.

My invention makes it possible to provide a satisfactory joint, particularly a pivot joint, in substantially the time it takes to make a spot weld, and those familiar with the art of spot welding will realize the high production, low cost features present.

Generally, in making a joint in accordance with the teachings of my invention, a plurality of weldable members are locally welded together, and the weld joint is then altered so as to provide for limited relative movement of the members. By limited movement, as herein used, is meant that the members may move relative to each other, yet are still connected.

In the drawing accompanying this specification, and forming a part of this application, I have shown for purposes of illustration, embodiments which my invention may assume, and in this drawing:

Figure 1 is a side elevational view of a plurality of members positioned between welding electrodes of a spot welder, the electrodes being fragmentarily shown, Figure 2 is a plan view of the members, after the welding operation, Figure 3 is a plan view of the members, after the joint has been formed, Figure 4 is an enlarged cross-sectional view corresponding generally to the line 4—4 of Figure 2, Figure 5 is an enlarged cross-sectional view corresponding generally to the line 5—5 of Figure 3, and Figure 6 is a cross-sectional view of another embodiment of the invention.

My invention is particularly adapted for making low cost pivot joints by the use of spot welding, and in this conection it has been found that the invention works especially well with an odd number of members of weldable material.

Referring particularly to Figures 1 through 5, a metallic member 10 is interposed flatwise between adjoining metallic members 11 and 12. The members thus positioned are interposed between welding electrodes 13 and 14 of any suitable spot welding machine, and a spot weld, indicated at 15 in Figures 2 and 3, is made.

In making a spot weld, with particular reference to Figure 4, the adjoining surfaces $a$ and $b$ of the members 10, 11, and 12, at local portions in line with the welding electrodes, are the first to reach a fusing temperature, and a weld takes place there. Usually, the weld is indicated by nuggets 16 and 17, as seen in Figures 4 and 5.

The next step in making the joint is to alter the welded union to provide for limited relative movement of the members. As herein disclosed, the member 10 and the members 11 and 12 are subjected to a force producing relative torsional strain of sufficient amount so that connection of the members at the welded area is broken in a manner to produce the pivot joint. This may be effected by holding the members 11 and 12 stationary, and so forcing the member 10 to rotate in its own plane that the greatest rotational strain is about the spot weld 15.

As best shown in Figure 5, such rotational strain causes a plug 18 to be torn out of the member 10, this plug still remaining welded to the members 11 and 12 and forming the pivot point about which the member 10 may rotate. Rotational strain tears out the plug 18 instead of breaking the weld for the reason that each of the nuggets 16 and 17 at one side is joined with respective members 11 and 12, whereas the other side of each of these nuggets is joined only with the intermediate member 10. Thus, assuming strain on each nugget is substantially equally distributed between the intermediate member and the adjoining members, the members 11 and 12 each receive about one-quarter of the total strain, whereas the member 10 receives about one-half of the total strain. Since the weld area is stronger than the parent metal, the member 10 will fracture in a line around the plug 18.

In Figure 6, I have shown five members spot welded together, the members 19 and 20 forming the intermediate members, and the members 21, 22, and 23 forming the adjoining members. Weld nuggets 24 are formed by the spot welding operation, and it is only further necessary to tear out plugs in the members 19 and 20 to form the pivot joints. Thus it will be clear that the number of aligned joints possible is limited only to the number of members which may be welded by spot welding methods.

The joint produced by my invention may find particular application in the manufacture of knives of the folding blade type, feeler gages, folding rules, and many other uses too numerous to mention.

From the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. The method of making a pivot joint, comprising: spot welding together an odd number of weldable members, applying sufficient torsional force to cause relative rotation between intermediate of said members and adjoining members to tear out a plug from the intermediate of said members to form a pivot point.

2. The method of making a pivot joint, comprising: spot welding an odd number of superimposed members to provide the usual generally axially aligned weld nuggets between intermediate and flanking members, and relatively rotating said intermediate and flanking members whereby the connected portions of said members adjacent to said weld nuggets are subjected to sufficient torque to tear out a slug from said intermediate member in line with and connected to said weld nuggets while leaving said slug connected to said flanking members through said weld nuggets, said slug being rotatable in the aperture it forms in said intermediate member.

3. Pivot means for an odd number of members, comprising: an intermediate member having an aperture; a pivot plug rotatable within said aperture and having welded connection with the flanking members.

4. Pivot means for an odd number of members, comprising: an intermediate member having an aperture; a pivot plug rotatable within said aperture and having a spot welded connection with the flanking members.

PRESTON M. HALL.

REFERENCES CITED

The following references are of record in the file of this patent:

UNITED STATES PATENTS

| Number | Name | Date |
| --- | --- | --- |
| 184,888 | Munzinger | Nov. 28, 1876 |
| 1,337,817 | Bode | Apr. 20, 1920 |

OTHER REFERENCES

"Welding Stainless Steels," pp. 55 and 57, copy 1943, by Allegheny Ludlum Steel Corp., Brackenbridge, Pa. (Copy in Div. 14.)

"Welding Handbook," pp. 322 and 1144, 1942 ed., published by American Welding Society, 33 W. 39th St., New York, N. Y. (Copy in Div. 14.)